United States Patent
Nam et al.

(10) Patent No.: US 12,127,154 B2
(45) Date of Patent: Oct. 22, 2024

(54) APERIODIC POSITIONING SIGNALS FOR USER EQUIPMENT (UE)-SPECIFIC POSITIONING

(71) Applicant: QUALCOMM Incorporated, San Diego, CA (US)

(72) Inventors: Wooseok Nam, San Diego, CA (US); Tao Luo, San Diego, CA (US); Sony Akkarakaran, Poway, CA (US); Yucheng Dai, San Diego, CA (US); Jingchao Bao, San Diego, CA (US)

(*) Notice: Subject to any disclaimer, the term of this patent is extended or adjusted under 35 U.S.C. 154(b) by 431 days.

(21) Appl. No.: 17/453,779

(22) Filed: Nov. 5, 2021

(65) Prior Publication Data

US 2023/0141465 A1    May 11, 2023

(51) Int. Cl.
*H04W 64/00* (2009.01)
*G01S 5/02* (2010.01)

(52) U.S. Cl.
CPC .......... *H04W 64/00* (2013.01); *G01S 5/0284* (2013.01)

(58) Field of Classification Search
CPC ..... H04W 64/00; H04W 76/14; G01S 5/0284; G06F 16/84; G06F 16/25; G16Y 10/40; G16Y 40/10
See application file for complete search history.

(56) References Cited

U.S. PATENT DOCUMENTS

| 2021/0195565 A1 | 6/2021 | Venugopal et al. |
| 2022/0386093 A1 | 12/2022 | Baek et al. |
| 2023/0309050 A1* | 9/2023 | Cha ........................ H04L 5/0023 |

FOREIGN PATENT DOCUMENTS

| WO | 2021096322 A1 | 5/2021 |
| WO | 2021208856 A1 | 10/2021 |
| WO | 2021216706 A1 | 10/2021 |

OTHER PUBLICATIONS

Caict: "Discussion on Potential Positioning Enhancements", 3GPP TSG RAN WG1 #103-e, R1-2009285, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020, 3 Pages, XP051945543, Paragraph [02.2].

Ericsson: "Enhancements for Commercial Use Cases", 3GPP TSG-RAN WG2 #112e, R2-2010072, 3rd Generation Partnership Project, Mobile Competence Centre, 650, Route Des Lucioles, F-06921 Sophia-Antipolis Cedex, France, vol. RAN WG2, No. Electronic meeting, Nov. 2, 2020-Nov. 13, 2020, Oct. 23, 2020, 12 Pages, XP051942786, Paragraph [2.1.3].

International Search Report and Written Opinion—PCT/US2022/078193—ISA/EPO—Jan. 18, 2023.

(Continued)

*Primary Examiner* — Kabir A Timory

(57) ABSTRACT

Various aspects of the present disclosure generally relate to wireless communication. In some aspects, a user equipment (UE) may receive, from an anchor node, control information that triggers a UE-specific aperiodic positioning signal. The UE may perform, to the anchor node, the UE-specific aperiodic positioning signal based at least in part on the control information. The UE may transmit, to the anchor node, a response based at least in part on the UE-specific aperiodic positioning signal. Numerous other aspects are described.

30 Claims, 9 Drawing Sheets

(56) References Cited

OTHER PUBLICATIONS

Vivo: "Discussion on Positioning Enhancement", 3GPP TSG-RAN WG2 Meeting #112-E, R2-2009039, 3rd Generation Partnership Project, Mobile Competence Centre, 650, Route Des Lucioles, F-06921 Sophia-Antipolis Cedex, France, vol. RAN WG2, No. Online, Nov. 2, 2020-Nov. 13, 2020, Oct. 23, 2020, 7 Pages, XP051942084, Figure 3.

* cited by examiner

APERIODIC POSITIONING SIGNALS FOR USER EQUIPMENT (UE)-SPECIFIC POSITIONING

FIELD OF THE DISCLOSURE

Aspects of the present disclosure generally relate to wireless communication and to techniques and apparatuses for aperiodic positioning signals for user equipment (UE)-specific positioning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from an anchor node, control information that triggers a UE-specific aperiodic positioning signal; perform, to the anchor node, the UE-specific aperiodic positioning signal based at least in part on the control information; and transmit, to the anchor node, a response based at least in part on the UE-specific aperiodic positioning signal.

In some implementations, an apparatus for wireless communication at an anchor node includes a memory and one or more processors, coupled to the memory, configured to: transmit, to a UE, control information that triggers a UE-specific aperiodic positioning signal; perform, to the UE, the UE-specific aperiodic positioning signal based at least in part on the control information; and receive, from the UE, a response based at least in part on the UE-specific aperiodic positioning signal.

In some implementations, a method of wireless communication performed by a UE includes receiving, from an anchor node, control information that triggers a UE-specific aperiodic positioning signal; performing, to the anchor node, the UE-specific aperiodic positioning signal based at least in part on the control information; and transmitting, to the anchor node, a response based at least in part on the UE-specific aperiodic positioning signal.

In some implementations, a method of wireless communication performed by an anchor node includes transmitting, to a UE, control information that triggers a UE-specific aperiodic positioning signal; performing, to the UE, the UE-specific aperiodic positioning signal based at least in part on the control information; and receiving, from the UE, a response based at least in part on the UE-specific aperiodic positioning signal.

In some implementations, a non-transitory computer-readable medium storing a set of instructions for wireless communication includes one or more instructions that, when executed by one or more processors of a UE, cause the UE to: receive, from an anchor node, control information that triggers a UE-specific aperiodic positioning signal; perform, to the anchor node, the UE-specific aperiodic positioning signal based at least in part on the control information; and transmit, to the anchor node, a response based at least in part on the UE-specific aperiodic positioning signal.

In some implementations, a non-transitory computer-readable medium storing a set of instructions for wireless communication includes one or more instructions that, when executed by one or more processors of an anchor node, cause the anchor node to: transmit, to a UE, control information that triggers a UE-specific aperiodic positioning signal; perform, to the UE, the UE-specific aperiodic positioning signal based at least in part on the control information; and receive, from the UE, a response based at least in part on the UE-specific aperiodic positioning signal.

In some implementations, an apparatus for wireless communication includes means for receiving, from an anchor node, control information that triggers an apparatus-specific aperiodic positioning signal; means for performing, to the anchor node, the apparatus-specific aperiodic positioning signal based at least in part on the control information; and means for transmitting, to the anchor node, a response based at least in part on the apparatus-specific aperiodic positioning signal.

In some implementations, an apparatus for wireless communication includes means for transmitting, to a UE, control information that triggers a UE-specific aperiodic positioning signal; means for performing, to the UE, the UE-specific aperiodic positioning signal based at least in part on the control information; and means for receiving, from the UE, a response based at least in part on the UE-specific aperiodic positioning signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
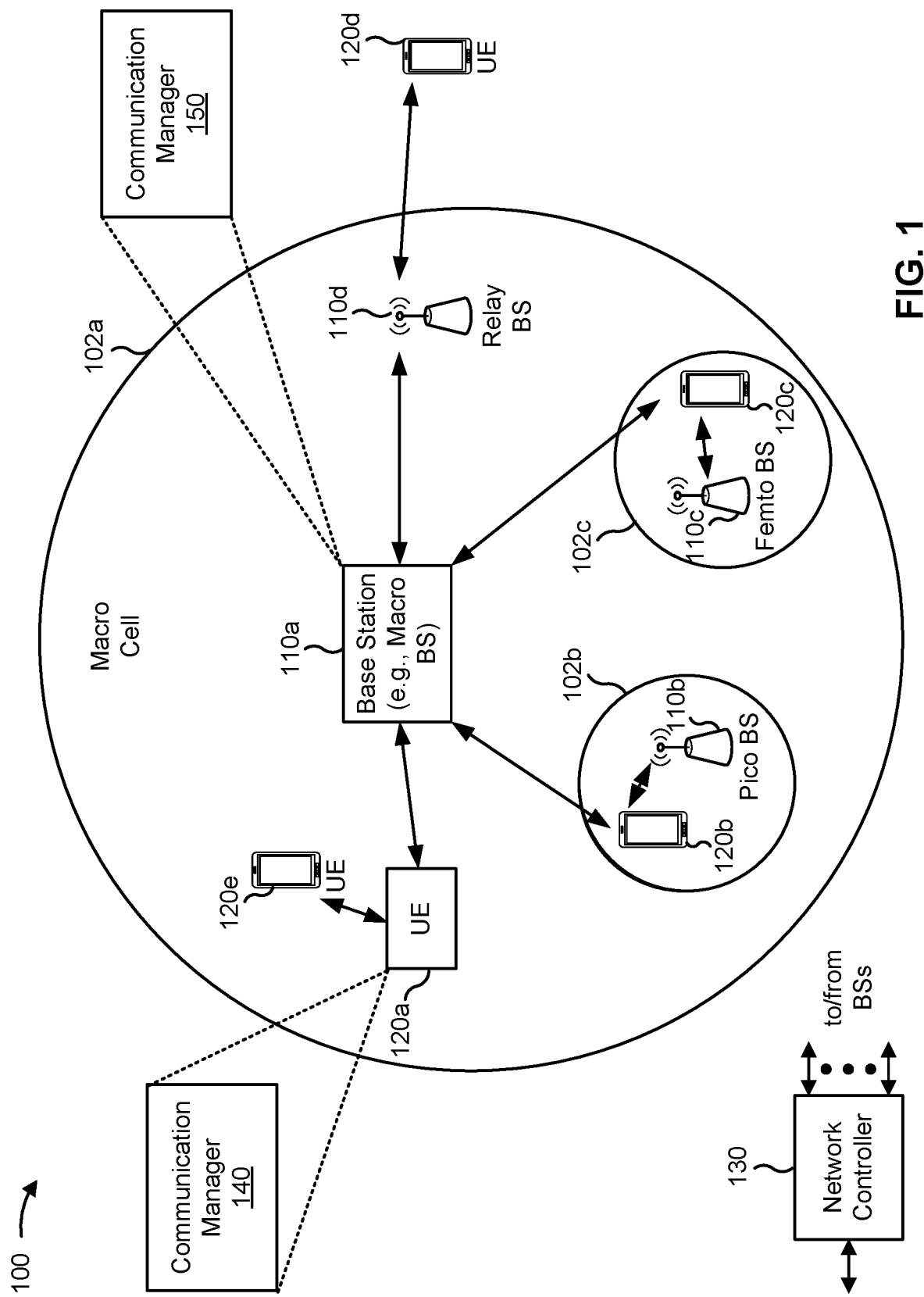
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from an anchor node, control information that triggers a UE-specific aperiodic positioning signal; perform, to the anchor node, the UE-specific aperiodic positioning signal based at least in part on the control information; and transmit, to the anchor node, a response based at least in part on the UE-specific aperiodic positioning signal. Additionally, or alternatively, the communication manager 140 may perform one or more other operations described herein.

In some aspects, an anchor node (e.g., base station 110 or UE 120) may include a communication manager 150. As described in more detail elsewhere herein, the communication manager 150 may transmit, to a UE, control information that triggers a UE-specific aperiodic positioning signal; perform, to the UE, the UE-specific aperiodic positioning signal based at least in part on the control information; and receive, from the UE, a response based at least in part on the UE-specific aperiodic positioning signal. Additionally, or alternatively, the communication manager 150 may perform one or more other operations described herein.

As indicated above, FIG. 1 is provided as an example. Other examples may differ from what is described with regard to FIG. 1.

Figure 2:
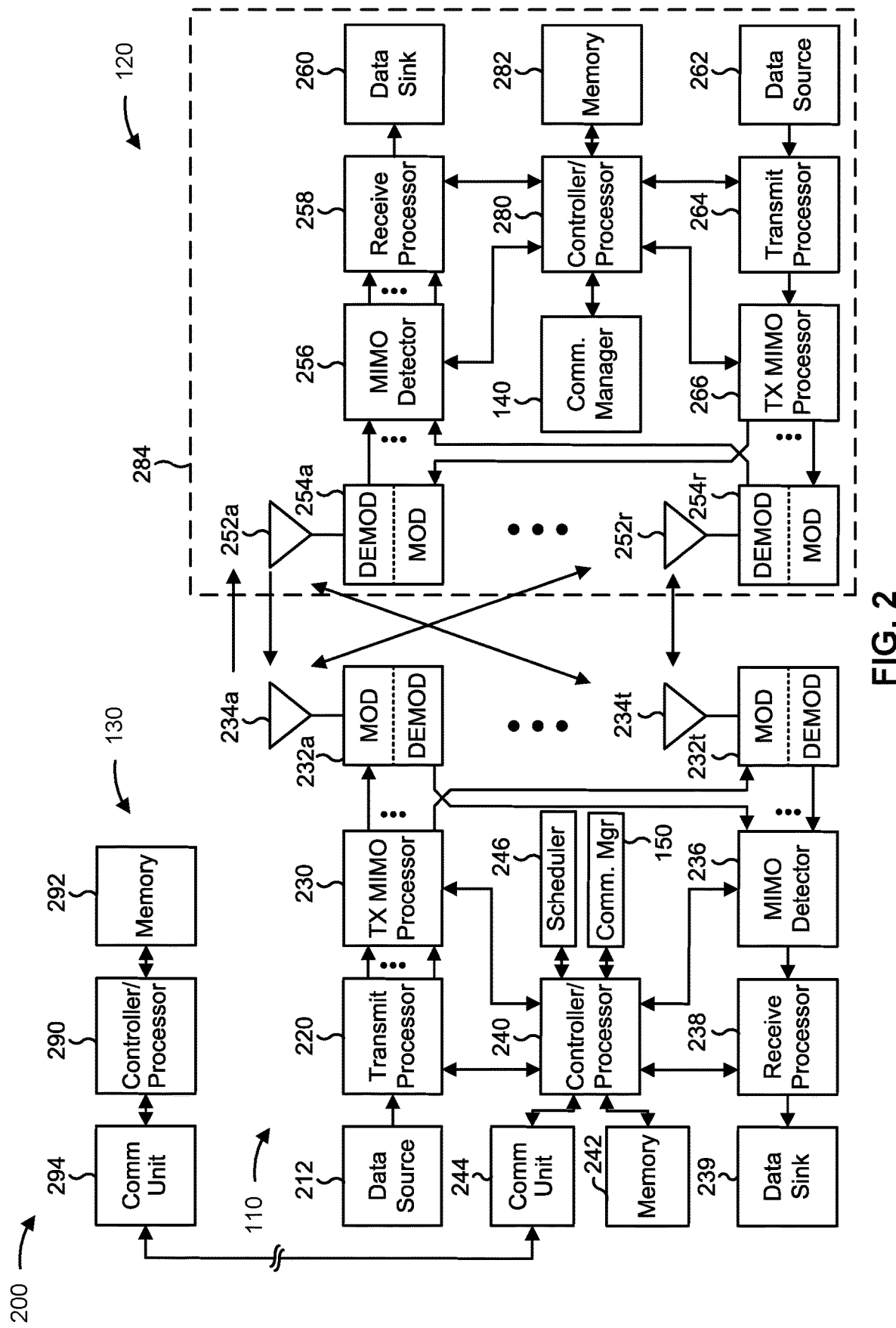
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with aperiodic positioning signals for UE-specific positioning, as described in more detail elsewhere herein. In some aspects, the anchor node described herein is the base station 110, is included in the base station 110, or includes one or more components of the base station 110 shown in FIG. 2. In some aspects, the anchor node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from an anchor node, control information that triggers a UE-specific aperiodic positioning signal; means for performing, to the anchor node, the UE-specific aperiodic positioning signal based at least in part on the control information; and/or means for transmitting, to the anchor node, a response based at least in part on the UE-specific aperiodic positioning signal. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an anchor node (e.g., base station 110 or UE 120) includes means for transmitting, to a UE, control information that triggers a UE-specific aperiodic positioning signal; means for performing, to the UE, the UE-specific aperiodic positioning signal based at least in part on the control information; and/or means for receiving, from the UE, a response based at least in part on the UE-specific aperiodic positioning signal. In some aspects, the means for the anchor node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the anchor node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

During an NR positioning, a base station may transmit a positioning reference signal (PRS) to a UE. The UE may perform a measurement of the PRS during a measurement gap. The UE may determine a position associated with the UE based at least in part on the measurement of the PRS, based at least in part on a UE-based sensing. Alternatively, the base station (or a location server) may determine the position associated with the UE, based at least in part on a UE-assisted sensing. For UE-assisted positioning, the UE may report the measurement of the PRS, and the base station may determine the position associated with the UE based at least in part on the measurement of the PRS. The NR positioning may be based at least in part on cell-specific and/or periodic PRS resources. The NR positioning may be based at least in part on a UE-initiated or network-initiated on-demand PRS.

Since the UE may not be scheduled during the measurement of the PRS, a periodicity of PRSs should be long enough to reduce an interruption of communication (e.g., reduce the overhead). In other words, due to a relatively long periodicity of the PRSs and considering that the UE is only able to perform measurements of the PRSs during measurement gaps, the UE may need to wait until a next measurement gap to measure the PRS and determine the position associated with the UE. Due to the relatively long periodicity of the PRSs, a latency in determining the position (or a positioning latency) may be relatively large. Further, in an mmWave system associated with FR2, the PRS may be transmitted with beam sweeping, which may further increase the system overhead.

In various aspects of techniques and apparatuses described herein, a UE may receive, from an anchor node, control information that triggers a UE-specific aperiodic positioning signal. The UE may perform, to the anchor node, the UE-specific aperiodic positioning signal based at least in part on the control information. In some aspects, the control information may be downlink control information (DCI), the UE-specific aperiodic positioning signal may be a downlink aperiodic PRS that is received from the anchor node, and the anchor node may be a base station. In some aspects, the control information may be DCI, the UE-specific aperiodic positioning signal may be an uplink aperiodic sounding reference signal (SRS) for positioning that is transmitted to the anchor node, and the anchor node may be the base station. In some aspects, the control information may be sidelink control information (SCI), the UE-specific aperiodic positioning signal may be a sidelink PRS that is received from the anchor node, and the anchor node may be a sidelink anchor node.

In some aspects, UE-specific and aperiodic positioning signals (which may include downlink PRSs or uplink SRSs) may reduce the positioning latency. An initiation of a positioning session in NR/LTE may be UE-specific, but the measurement of the UE-specific aperiodic positioning signal at the UE may still rely on a cell-specific and periodic positioning signal. The positioning session may be an LIE positioning protocol (LPP) session. In some aspects, the UE or a base station may initiate a UE-specific aperiodic positioning signal transmission, which may result in a reduced latency when determining the position of the UE. The UE-specific and aperiodic positioning signals may be based at least in part on a Uu-only positioning (e.g., positioning based on signaling between the UE and the base station), or the UE-specific and aperiodic positioning signal may be based at least in part on a sidelink-assisted position (e.g., position based on signaling between the UE and another UE via a sidelink).

Figure 3:
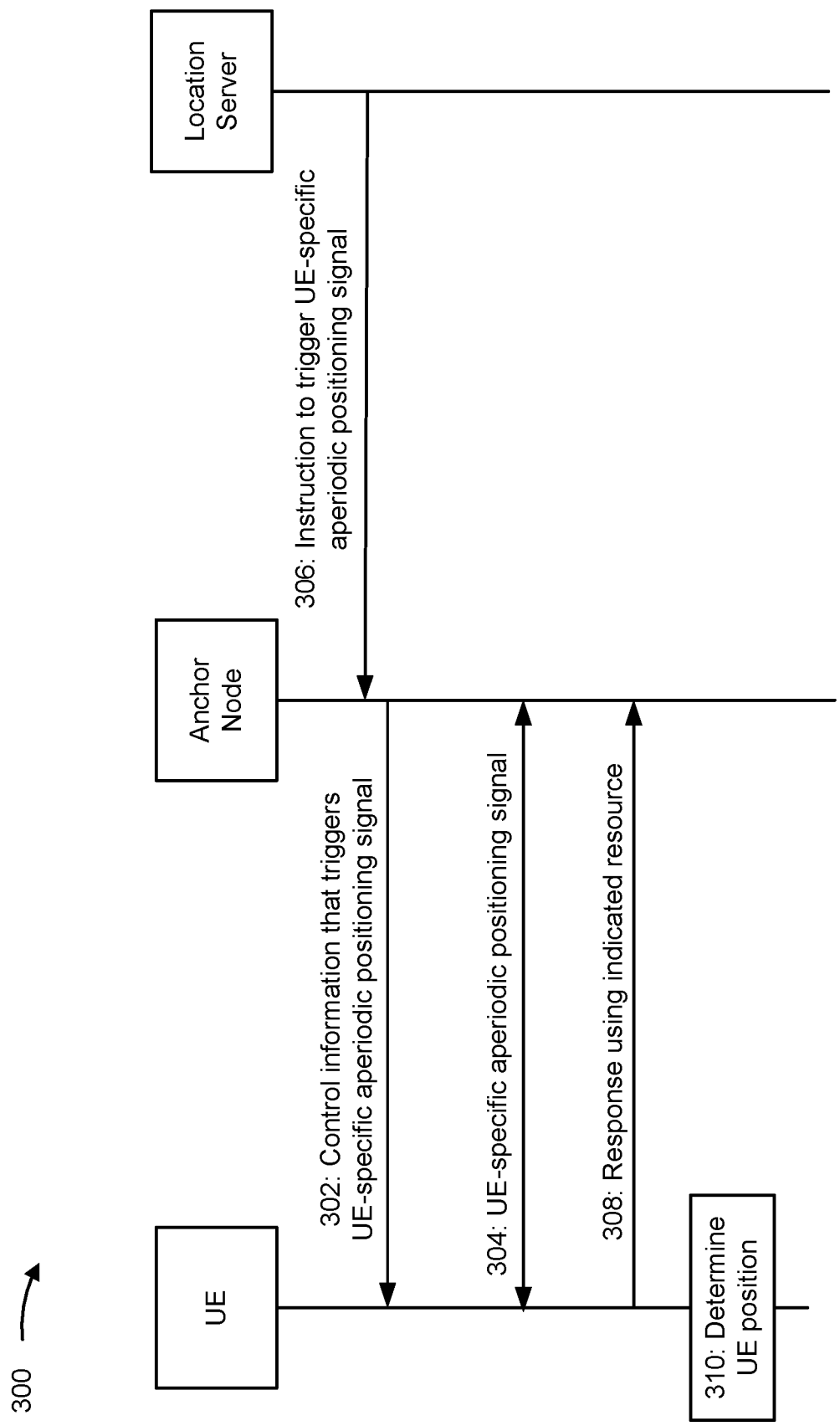
FIG. 3 is a diagram illustrating an example associated with aperiodic positioning signals for UE-specific positioning, in accordance with the present disclosure.

FIG. 3 is a diagram illustrating an example 300 associated with aperiodic positioning signals for UE-specific positioning, in accordance with the present disclosure. As shown in FIG. 3, example 300 includes communication between a UE (e.g., UE 120a) and an anchor node (e.g., base station 110 or UE 120e). In some aspects, the UE and the anchor node may be included in a wireless network, such as wireless network 100.

As shown by reference number 302, the UE may receive, from the anchor node, control information that triggers a UE-specific aperiodic positioning signal. The anchor node may be a base station (e.g., gNB or eNB) or a sidelink anchor node (e.g., a sidelink UE). In some aspects, when the anchor node is the base station, the anchor node may be associated with a primary cell as opposed to a secondary cell. The anchor node may be a positioning anchor node in a wireless network responsible for determining the position of the UE and/or for assisting the UE to determine a positioning of the UE. The control information may be DCI when the anchor node is the base station, or the control information may be SCI when the anchor node is the sidelink anchor node. The UE-specific aperiodic positioning signal may be a downlink aperiodic PRS or a sidelink PRS. Alternatively, the UE-specific aperiodic positioning signal may be an uplink aperiodic SRS for positioning.

As shown by reference number 304, the UE may perform, to the anchor node, the UE-specific aperiodic positioning signal based at least in part on the control information, where the UE-specific aperiodic positioning signal may be the downlink aperiodic PRS, the sidelink PRS, or the uplink aperiodic SRS. In some aspects, the UE may receive, from the anchor node, the downlink aperiodic PRS based at least in part on the DCI received from the anchor node. In some aspects, the UE may receive, from the anchor node, the sidelink PRS based at least in part on the SCI received from the anchor node. In some aspects, the UE may transmit, to the anchor node, the uplink aperiodic SRS based at least in part on the DCI received from the anchor node.

In some aspects, the UE may receive, from a location server, an indication that the location server has initiated a positioning session with the UE, where the UE-specific aperiodic positioning signal may be triggered by the anchor node based at least in part on an instruction from the location server to the anchor node. In some aspects, the UE may initiate the positioning session with the location server, where the UE-specific aperiodic positioning signal may be triggered by the anchor node based at least in part on the instruction from the location server to the anchor node. In some aspects, the UE may receive, from a sidelink hub UE, an indication that the sidelink hub UE has initiated the positioning session with the UE, where the UE-specific aperiodic positioning signal may be triggered by the anchor node based at least in part on an instruction from the sidelink hub UE to the anchor node.

In some aspects, during a UE or group-specific positioning procedure, the location server (or positioning hub) may initiate the positioning session (e.g., an LPP session) with a UE (e.g., a specific target UE). The location server may be co-located with the anchor node (e.g., when the anchor node is the base station), or alternatively, the location server may be a separate network entity as compared to the anchor node. In some cases, the UE may request or initiate the positioning session (e.g., UE-initiated positioning). Further, higher-layer messages (e.g., LPP messages) may be exchanged with the UE during the positioning session.

In some aspects, in a sidelink-assisted positioning, the sidelink anchor UE or a sidelink hub UE may initiate the positioning session (e.g., in an out-of-coverage scenario). The sidelink hub UE may communicate with other sidelink anchor nodes and control a sidelink PRS transmission from the other sidelink anchor nodes.

As shown by reference number 306, the location server may instruct the anchor node to trigger the UE-specific aperiodic positioning signal. For example, the location server may instruct the anchor node to transmit the UE-specific aperiodic PRS to the UE. The UE may perform a measurement of the UE-specific aperiodic PRS during the positioning session.

In some aspects, when the anchor node is the base station, the anchor node may trigger a downlink aperiodic Uu-PRS (e.g., a PRS transmitted by the anchor node to the UE). The anchor node may trigger the downlink aperiodic Uu-PRS via a DCI, such as DCI format 0_1, DCI format 0_2, DCI format 1_1, or DCI format 1_2. The anchor node may trigger an uplink aperiodic SRS for positioning (e.g., an uplink aperiodic SRS transmitted by the UE for positioning purposes). The anchor node may trigger the uplink aperiodic SRS via the DCI, such as the DCI format 0_1 or DCI format 0_2. In some aspects, when the anchor node is the sidelink anchor node, the sidelink anchor node may trigger a sidelink PRS via an SCI, such as SCI format 1-A/2-A/2-B.

In some aspects, the UE may receive, from the anchor node, a configuration of aperiodic positioning signal resources via a higher layer message. The configuration may indicate a time and frequency resource for the UE-specific aperiodic positioning signal, a sequence, a resource element mapping pattern, a transmit power, a triggering state including a transmission configuration indication (TCI) state or quasi co-location (QCL) properties, or a triggering offset associated with the UE-specific aperiodic positioning signal.

In some aspects, a resource configuration (the configuration of aperiodic positioning signal resources) may be transmitted to the UE via a higher layer LPP message. The resource configuration may be associated with aperiodic PRS/SRS resources. The resource configuration may be transmitted to the UE prior to the triggering of the downlink aperiodic Uu-PRS or prior to the triggering of the uplink aperiodic SRS. The resource configuration may indicate a time/frequency resource and a triggering offset for the aperiodic PRS/SRS. The resource configuration may indicate a sequence, a resource element mapping or hopping or staggering pattern, a quantity of repetitions, and/or a transmission power. The resource configuration may indicate a triggering state (e.g., TCI state or QCL properties for beam sweeping) and associated cell(s) or anchor node(s) (e.g., the base station or the sidelink anchor node) associated with the PRS/SRS.

In some aspects, the UE-specific aperiodic positioning signal may be one of a plurality of UE-specific aperiodic positioning signals transmitted by the anchor node using beam sweeping. UE-specific aperiodic positioning signals of the plurality of UE-specific aperiodic positioning signals may be triggered with different TCI states or QCL properties. In some aspects, due to a lack of synchronization and beam alignment between the UE (or target node) and non-serving/neighboring cells or anchor nodes, multiple aperiodic PRS/SRS resources or resource sets may be transmitted with beam sweeping. Multiple aperiodic PRS/SRS resource may be triggered with different TCI state/QCL properties.

In some aspects, the UE may receive, from the anchor node, an indication of a resource for transmitting a response to the anchor node based at least in part on the UE-specific aperiodic positioning signal. The resource may be associated with one or more UE-specific aperiodic positioning signal resources, one or more cells, or one or more anchor nodes. The indication may be received via radio resource control (RRC) signaling or via the control information that triggers the UE-specific aperiodic positioning signal.

In some aspects, a set of resources (e.g., physical (PHY) layer resources) for responding to the UE-specific aperiodic positioning signal (e.g., the PRS) may be assigned to the UE. A resource of the set of resources may be associated with one or more PRS resource(s), cell(s), and/or anchor node(s). The resource may be configured via RRC signaling. Alternatively, the resource may be dynamically reserved/indicated by a triggering DCI/SCI of the aperiodic PRS/SRS.

As shown by reference number 308, the UE may transmit, to the anchor node, a response based at least in part on the UE-specific aperiodic positioning signal. The UE may transmit the response using the resource indicated by the anchor node. The response may indicate an acknowledgement of a reception of the UE-specific aperiodic positioning signal, a measurement report that includes a measurement or a resource identifier associated with the UE-specific aperiodic positioning signal, or another reference signal transmission for a round-trip time (RTT)-based positioning. The response may be a positive response when the UE-specific aperiodic positioning signal. The response may be a negative response when the UE-specific aperiodic positioning signal is not received.

In some aspects, the UE may transmit the response based at least in part on a condition being satisfied. For example, the condition may be satisfied based at least in part on a power level associated with the UE-specific aperiodic positioning signal satisfying a threshold. In some aspects, conditions for transmitting the response may be indicated to the UE. For example, the conditions may include an RSRP threshold for triggering the response. The response may be opportunistic based at least in part on a fulfillment of the conditions.

In some aspects, the UE may transmit the response to the anchor node using the set of resources. The response may indicate an acknowledgement of an aperiodic PRS reception. The response may indicate a measurement report, which may be based at least in part on a received aperiodic PRS. The measurement report may indicate an RSRP, an absolute/relative delay measurement, and/or a PRS resource identifier. The response may indicate another sidelink PRS or SRS transmission for an RTT-based positioning.

In some aspects, the anchor node may perform an early termination of the beam sweeping of the UE-specific aperiodic positioning signal based at least in part on the response received from the UE. In other words, the response transmitted by the UE may trigger, at the anchor node, the early termination of the beam sweeping of the UE-specific aperiodic positioning signal.

In some aspects, based at least in part on the response received from the UE, the anchor node may early terminate a PRS beam sweeping. By reducing a likelihood of an unnecessary PRS transmission, a positioning latency and overhead may be improved. When multiple UEs (or target nodes) share same PRSs, responses from the multiple UEs may be consolidated to determine the early termination of the beam sweeping. A consolidation and usage of responses for the determination of the early termination of beam sweeping may be based at least in part on a network implementation. In other words, the anchor node may determine the early termination of beam sweeping based at least in part on the responses from the multiple UEs. For example, when responses are received from a plurality of UEs, the anchor node may determine to terminate the beam sweeping.

In some aspects, when the response is not received at the anchor node or the response is a negative response indicated that the UE-specific aperiodic positioning signal was not received, the UE-specific aperiodic positioning signal may be retriggered by the anchor node, the anchor node may no longer be used for positioning, or the UE-specific aperiodic positioning signal may be reconfigured using an alternate configuration and retriggered by the anchor node. In some aspects, no response may be received at the anchor node. The UE may not transmit any response when the response is negative. Alternatively, the response may be received at the anchor node but the response may be negative.

In some aspects, no response may be received at the anchor node after a plurality of beams are swept. In one example, when no response is received, a same aperiodic PRS may be triggered again, based at least in part on an automatic retriggering until a maximum quantity of retriggerings are reached or a response is received. The anchor node may transmit control information (e.g., DCI for a base station or SCI for sidelink) to trigger the same aperiodic PRS. In another example, when no response is received, the anchor node may not be used for positioning. The UE may not transmit a PRS measurement report to the anchor node at a later time. In other words, since the anchor node did not receive any response, the anchor node may not be suitable for positioning. In yet another example, when no response is received, the anchor node may reconfigure a PRS (e.g., transmit power and/or TCI states) and retrigger the aperiodic PRS.

As shown by reference number 310, the UE may determine a position associated with the UE using the UE-specific aperiodic positioning signal. The UE-specific aperiodic positioning signal may enable the UE to determine the position with a lower positioning latency, as compared to a periodic positioning signal with a relatively long periodicity.

As indicated above, FIG. 3 is provided as an example. Other examples may differ from what is described with regard to FIG. 3.

Figure 4:
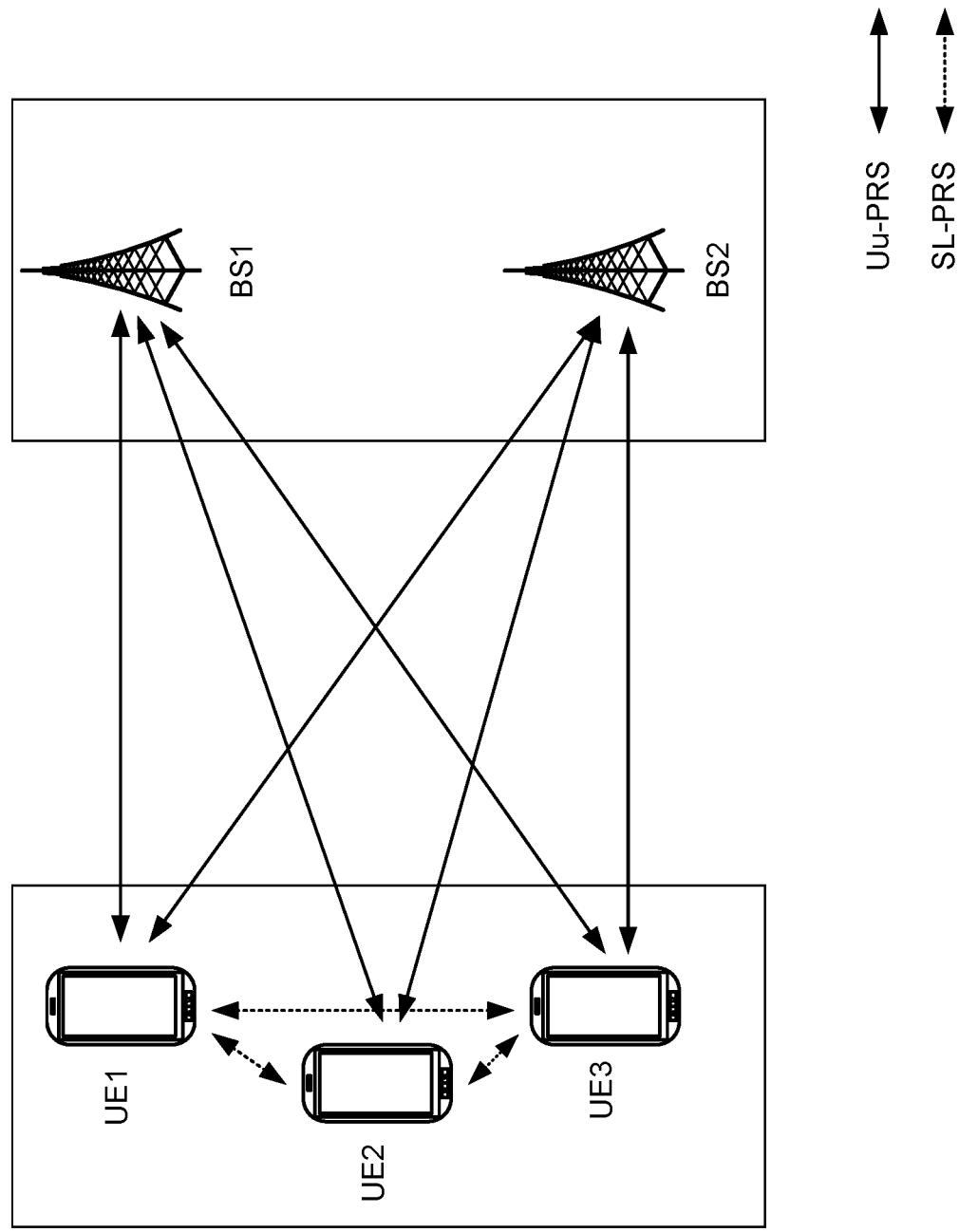
FIG. 4 is a diagram illustrating an example associated with sidelink positioning using UE-specific aperiodic positioning reference signals (PRSs), in accordance with the present disclosure.

FIG. 4 is a diagram illustrating an example 400 associated with sidelink positioning using UE-specific aperiodic PRSs, in accordance with the present disclosure.

For sidelink positioning, a UE (e.g., a target UE) may receive a PRS from one or more anchor nodes. The PRS may be a UE-specific aperiodic PRS. The anchor nodes may include a base station. For example, the UE may receive the PRS from the base station over a Uu interface. The anchor nodes may include a sidelink anchor node. For example, the UE may receive the PRS from the sidelink anchor node over a sidelink interface. The anchor sidelink node may be another UE associated with an accurate position. In some cases, the UE may receive the PRS only via the sidelink interface.

As shown in FIG. 4, a first UE may receive a Uu-PRS from a first base station and a Uu-PRS from a second base station. The first UE may also receive a sidelink PRS from a second UE and a sidelink PRS from a third UE. Similarly, the second UE may receive a Uu-PRS from the first base station and a Uu-PRS from the second base station. The second UE may also receive a sidelink PRS from the first UE and a sidelink PRS from the third UE. Similarly, the third UE may receive a Uu-PRS from the first base station and a Uu-PRS from the second base station. The third UE may also receive a sidelink PRS from the first UE and a sidelink PRS from the second UE.

In some aspects, for UEs with relatively poor channel conditions (e.g., fewer line-of-sight (LOS) Uu links), the sidelink positioning may add additional LOS links. For example, indoor factory channels may be associated with lower LOS probabilities. A total quantity of LOS links may include Uu LOS links and sidelink LOS links. In some aspects, for UEs with relatively good channel conditions, the sidelink positioning may improve an overall positioning accuracy by providing additional measurements. For example, the sidelink positioning may provide power-efficient P2P positioning and ranging for public safety and other uses, or the sidelink positioning may be applicable to a group of devices that are out-of-coverage that are attempting to determine relative positions of each other. Further, a sidelink sensing may be handled jointly with the sidelink positioning.

As indicated above, FIG. 4 is provided as an example. Other examples may differ from what is described with regard to FIG. 4.

Figure 5:
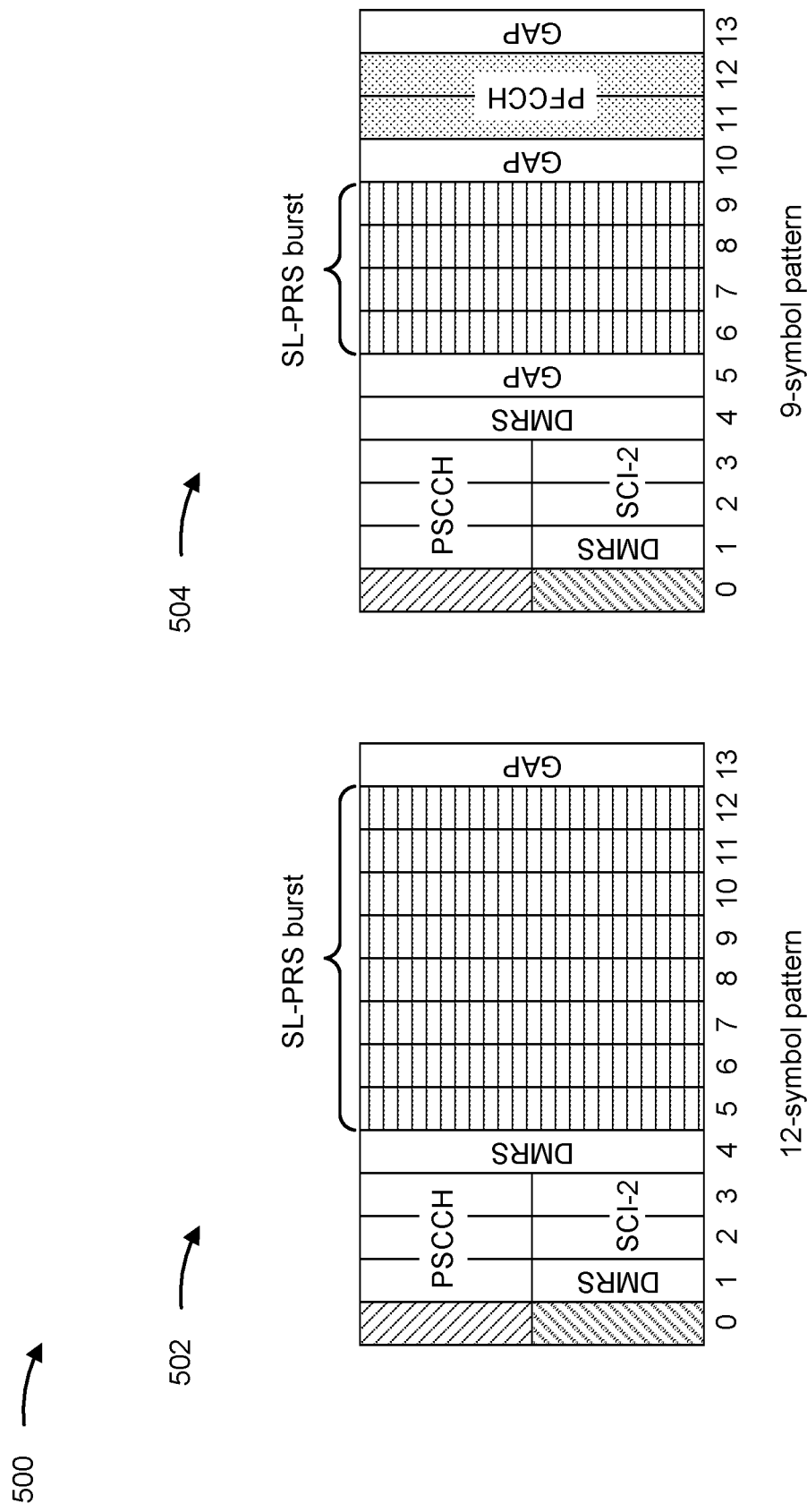
FIG. 5 is a diagram illustrating an example associated with a slot for a UE-specific aperiodic sidelink PRS, in accordance with the present disclosure.

FIG. 5 is a diagram illustrating an example 500 associated with a slot for a UE-specific aperiodic sidelink PRS, in accordance with the present disclosure.

In some aspects, a dedicated slot structure for a sidelink PRS may be defined. A slot in accordance with the dedicated slot structure may include a physical sidelink shared channel (PSSCH) that carries a sidelink control information stage one (SCI-1), a sidelink control information stage two (SCI-2), a DMRS, and a sidelink PRS, and without a sidelink shared channel (SL-SCH). The sidelink PRS may be associated with a staggered comb pattern, similar to a Uu-PRS. A candidate slot and sidelink PRS pattern may be (pre)-configured and may be indicated by a control signal, e.g., SCI-2.

In some aspects, the slot may be associated with a different transmit power and timing for the sidelink PRS as compared to other sidelink transmissions. A sidelink PRS power and timing may also be different within the slot as compared to a physical sidelink control channel (PSCCH), an SCI-2, and/or a DMRS. Further, a gap symbol may be within the slot before and after a sidelink PRS burst.

As shown by reference number 502, in a slot for a UE-specific aperiodic sidelink PRS associated with a 12-symbol pattern, the slot may include a PSCCH, DMRSs, an SCI-2, a sidelink PRS burst associated with 8 symbols, and a gap symbol. The sidelink PRS burst may be associated with a UE-specific aperiodic PRS.

As shown by reference number 504, in a slot for a UE-specific aperiodic sidelink PRS associated with a 9-symbol pattern, the slot may include a PSCCH, DMRSs, an SCI-2, a sidelink PRS burst associated with 4 symbols, a physical sidelink feedback channel (PSFCH), and multiple gap symbols. The sidelink PRS burst may be associated with a UE-specific aperiodic PRS.

As indicated above, FIG. 5 is provided as an example. Other examples may differ from what is described with regard to FIG. 5.

Figure 6:
FIGS. 6-7 are diagrams illustrating example processes associated with aperiodic positioning signals for UE-specific positioning, in accordance with the present disclosure.

FIG. 6 is a diagram illustrating an example process 600 performed, for example, by a UE, in accordance with the present disclosure. Example process 600 is an example where the UE (e.g., UE 120) performs operations associated with aperiodic positioning signals for UE-specific positioning.

As shown in FIG. 6, in some aspects, process 600 may include receiving, from an anchor node, control information that triggers a UE-specific aperiodic positioning signal (block 610). For example, the UE (e.g., using communication manager 140 and/or reception component 802, depicted in FIG. 8) may receive, from an anchor node, control information that triggers a UE-specific aperiodic positioning signal, as described above.

As further shown in FIG. 6, in some aspects, process 600 may include performing, to the anchor node, the UE-specific aperiodic positioning signal based at least in part on the control information (block 620). For example, the UE (e.g., using communication manager 140, and/or reception component 802 or transmission component 804, depicted in FIG. 8) may perform, to the anchor node, the UE-specific aperiodic positioning signal based at least in part on the control information, as described above.

As further shown in FIG. 6, in some aspects, process 600 may include transmitting, to the anchor node, a response based at least in part on the UE-specific aperiodic positioning signal (block 630). For example, the UE (e.g., using communication manager 140 and/or transmission component 804, depicted in FIG. 8) may transmit, to the anchor node, a response based at least in part on the UE-specific aperiodic positioning signal, as described above.

Process 600 may include additional aspects, such as any single aspect or any combination of aspects described below and/or in connection with one or more other processes described elsewhere herein.

In a first aspect, the control information is DCI, the UE-specific aperiodic positioning signal is a downlink aperiodic PRS that is received from the anchor node, and the anchor node is a base station.

In a second aspect, alone or in combination with the first aspect, the control information is DCI, the UE-specific aperiodic positioning signal is an uplink aperiodic SRS for positioning that is transmitted to the anchor node, and the anchor node is a base station.

In a third aspect, alone or in combination with one or more of the first and second aspects, the control information is SCI, the UE-specific aperiodic positioning signal is a sidelink PRS that is received from the anchor node, and the anchor node is a sidelink anchor node.

In a fourth aspect, alone or in combination with one or more of the first through third aspects, process 600 includes receiving, from a location server, an indication that the location server has initiated a positioning session with the UE, wherein the UE-specific aperiodic positioning signal is triggered by the anchor node based at least in part on an instruction from the location server to the anchor node.

In a fifth aspect, alone or in combination with one or more of the first through fourth aspects, process 600 includes initiating a positioning session with a location server, wherein the UE-specific aperiodic positioning signal is triggered by the anchor node based at least in part on an instruction from the location server to the anchor node.

In a sixth aspect, alone or in combination with one or more of the first through fifth aspects, process 600 includes receiving, from a sidelink hub UE, an indication that the sidelink hub UE has initiated a positioning session with the UE, wherein the UE-specific aperiodic positioning signal is triggered by the anchor node based at least in part on an instruction from the sidelink hub UE to the anchor node.

In a seventh aspect, alone or in combination with one or more of the first through sixth aspects, process 600 includes receiving, from the anchor node, a configuration of aperiodic positioning signal resources via a higher layer message, wherein the configuration indicates one or more of a time and frequency resource for the UE-specific aperiodic positioning signal, a sequence, a resource element mapping pattern, a transmit power, a triggering state including a TCI state or QCL properties, or a triggering offset associated with the UE-specific aperiodic positioning signal.

In an eighth aspect, alone or in combination with one or more of the first through seventh aspects, the UE-specific aperiodic positioning signal is one of a plurality of UE-specific aperiodic positioning signals transmitted by the anchor node using beam sweeping, wherein UE-specific aperiodic positioning signals of the plurality of UE-specific aperiodic positioning signals are triggered with different TCI states or QCL properties.

In a ninth aspect, alone or in combination with one or more of the first through eighth aspects, process 600 includes receiving, from the anchor node, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and the indication is received via RRC signaling or via the control information that triggers the UE-specific aperiodic positioning signal.

In a tenth aspect, alone or in combination with one or more of the first through ninth aspects, the response transmitted to the anchor node based at least in part on the UE-specific aperiodic positioning signal indicates one or more of an acknowledgement of a reception of the UE-specific aperiodic positioning signal, a measurement report that includes a measurement or a resource identifier associated with the UE-specific aperiodic positioning signal, or another reference signal transmission for an RTT-based positioning.

In an eleventh aspect, alone or in combination with one or more of the first through tenth aspects, process 600 includes transmitting the response based at least in part on a condition being satisfied, wherein the condition is satisfied based at least in part on a power level associated with the UE-specific aperiodic positioning signal satisfying a threshold.

In a twelfth aspect, alone or in combination with one or more of the first through eleventh aspects, the response transmitted by the UE triggers, at the anchor node, an early termination of a beam sweeping of the UE-specific aperiodic positioning signal.

In a thirteenth aspect, alone or in combination with one or more of the first through twelfth aspects, the response is not received at the anchor node or the response is a negative response indicated that the UE-specific aperiodic positioning signal was not received, and the UE-specific aperiodic positioning signal is retriggered by the anchor node, the anchor node is no longer used for positioning, or the UE-specific aperiodic positioning signal is reconfigured using an alternate configuration and retriggered by the anchor node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
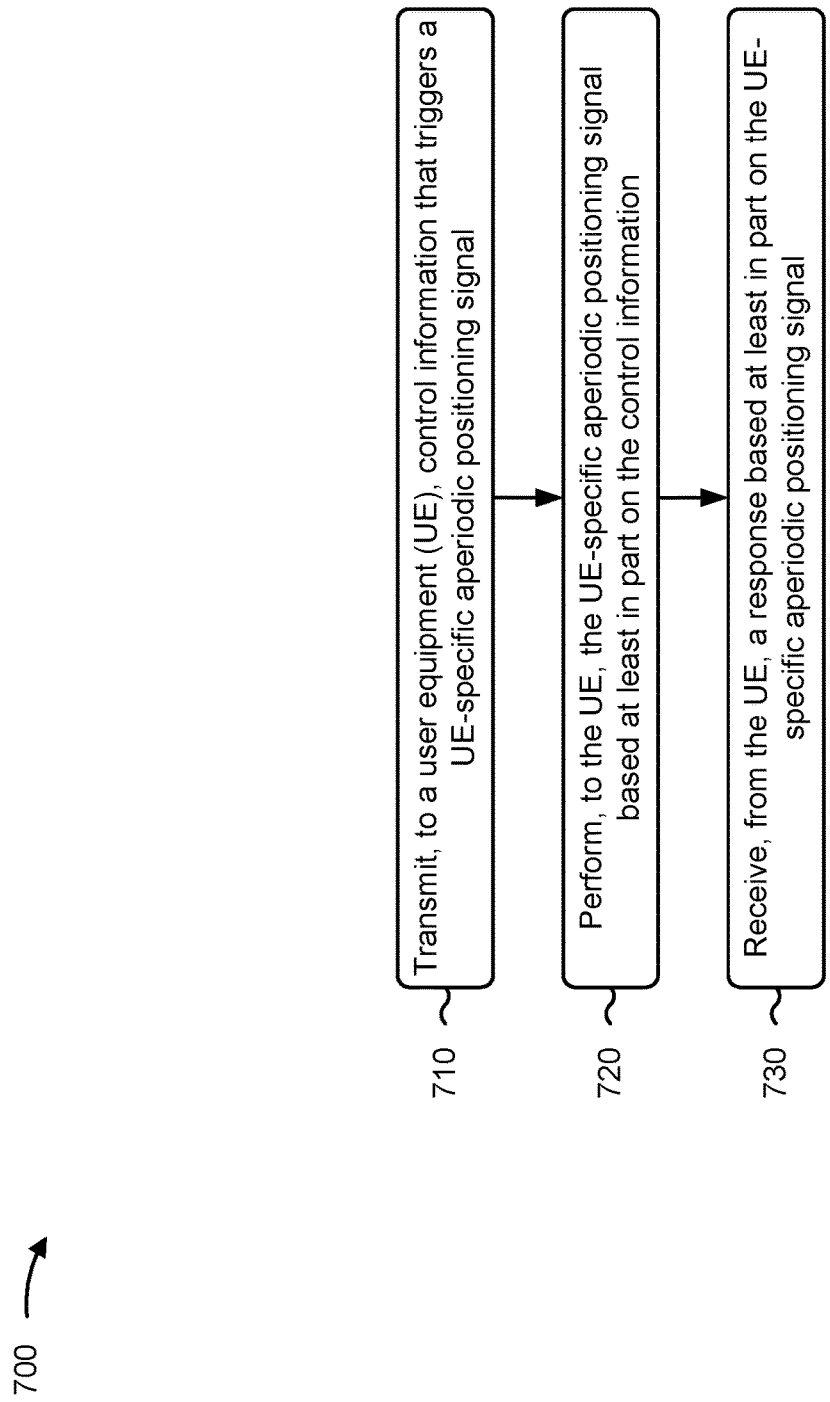

FIG. 7 is a diagram illustrating an example process 700 performed, for example, by an anchor node, in accordance with the present disclosure. Example process 700 is an example where the anchor node (e.g., base station 110) performs operations associated with aperiodic positioning signals for UE-specific positioning.

As shown in FIG. 7, in some aspects, process 700 may include transmitting, to a UE, control information that triggers a UE-specific aperiodic positioning signal (block 710). For example, the anchor node (e.g., using communication manager 150 and/or transmission component 904, depicted in FIG. 9) may transmit, to a UE, control information that triggers a UE-specific aperiodic positioning signal, as described above.

As further shown in FIG. 7, in some aspects, process 700 may include performing, to the UE, the UE-specific aperiodic positioning signal based at least in part on the control information (block 720). For example, the anchor node (e.g., using communication manager 150, and/or reception component 902 or transmission component 904, depicted in FIG. 9) may perform, to the UE, the UE-specific aperiodic positioning signal based at least in part on the control information, as described above.

As further shown in FIG. 7, in some aspects, process 700 may include receiving, from the UE, a response based at least in part on the UE-specific aperiodic positioning signal (block 730). For example, the anchor node (e.g., using communication manager 150 and/or reception component 902, depicted in FIG. 9) may receive, from the UE, a response based at least in part on the UE-specific aperiodic positioning signal, as described above.

Process 700 may include additional aspects, such as any single aspect or any combination of aspects described below and/or in connection with one or more other processes described elsewhere herein.

In a first aspect, the control information is DCI, the UE-specific aperiodic positioning signal is a downlink aperiodic PRS that is transmitted to the UE, and the anchor node is a base station.

In a second aspect, alone or in combination with the first aspect, the control information is DCI, the UE-specific aperiodic positioning signal is an uplink aperiodic SRS for positioning that is received from the UE, and the anchor node is a base station.

In a third aspect, alone or in combination with one or more of the first and second aspects, the control information is SCI, the UE-specific aperiodic positioning signal is a sidelink PRS that is transmitted to the UE, and the anchor node is a sidelink anchor node.

In a fourth aspect, alone or in combination with one or more of the first through third aspects, process 700 includes receiving, from a location server, an indication that the location server has initiated a positioning session with the UE, wherein the UE-specific aperiodic positioning signal is triggered by the anchor node based at least in part on an instruction from the location server to the anchor node.

In a fifth aspect, alone or in combination with one or more of the first through fourth aspects, process 700 includes receiving, from a location server, an instruction for the anchor node to trigger the UE-specific aperiodic positioning signal.

In a sixth aspect, alone or in combination with one or more of the first through fifth aspects, process 700 includes transmitting, to the UE, a configuration of aperiodic positioning signal resources via a higher layer message, wherein the configuration indicates one or more of a time and frequency resource for the UE-specific aperiodic positioning signal, a sequence, a resource element mapping pattern, a transmit power, a triggering state including a TCI state or QCL properties, or a triggering offset associated with the UE-specific aperiodic positioning signal.

In a seventh aspect, alone or in combination with one or more of the first through sixth aspects, the UE-specific aperiodic positioning signal is one of a plurality of UE-specific aperiodic positioning signals transmitted by the anchor node using beam sweeping, wherein UE-specific aperiodic positioning signals of the plurality of UE-specific aperiodic positioning signals are triggered with different TCI states or QCL properties.

In an eighth aspect, alone or in combination with one or more of the first through seventh aspects, process 700 includes transmitting, to the UE, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and the indication is received via RRC signaling or via the control information that triggers the UE-specific aperiodic positioning signal.

In a ninth aspect, alone or in combination with one or more of the first through eighth aspects, the response transmitted to the anchor node based at least in part on the UE-specific aperiodic positioning signal indicates one or more of an acknowledgement of a reception of the UE-specific aperiodic positioning signal, a measurement report that includes a measurement or a resource identifier associated with the UE-specific aperiodic positioning signal, or another reference signal transmission for an RTT-based positioning.

In a tenth aspect, alone or in combination with one or more of the first through ninth aspects, process 700 includes receiving the response based at least in part on a condition being satisfied, wherein the condition is satisfied based at least in part on a power level associated with the UE-specific aperiodic positioning signal satisfying a threshold.

In an eleventh aspect, alone or in combination with one or more of the first through tenth aspects, process 700 includes performing an early termination of a beam sweeping of the UE-specific aperiodic positioning signal based at least in part on the response received from the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
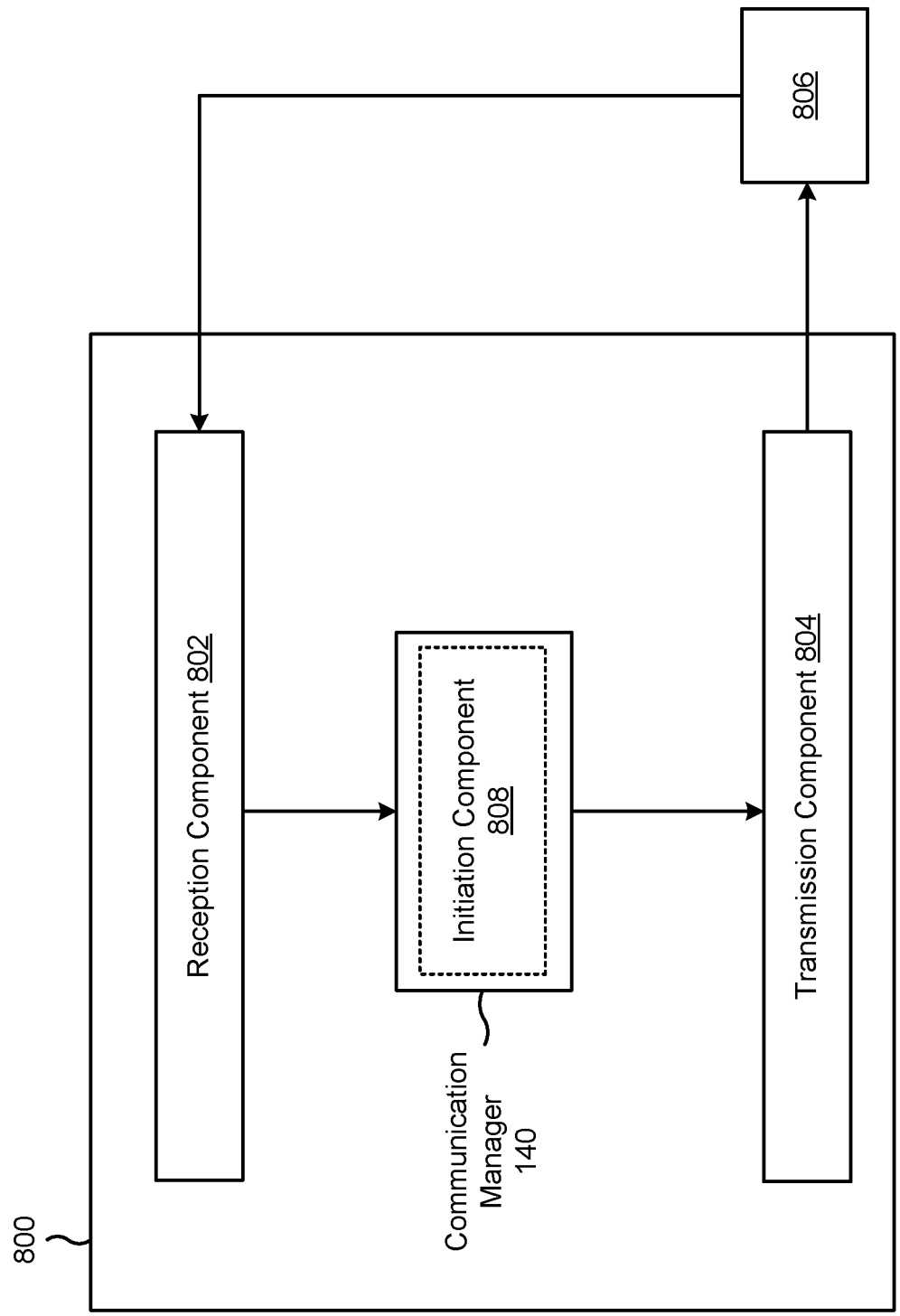
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include an initiation component 808, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from an anchor node, control information that triggers a UE-specific aperiodic positioning signal. The reception component 802 or the transmission component 804 may perform, to the anchor node, the UE-specific aperiodic positioning signal based at least in part on the control information. The transmission component 804 may transmit, to the anchor node, a response based at least in part on the UE-specific aperiodic positioning signal.

The reception component 802 may receive, from a location server, an indication that the location server has initiated a positioning session with the UE, wherein the UE-specific aperiodic positioning signal is triggered by the anchor node based at least in part on an instruction from the location server to the anchor node. The initiation component 808 may initiate a positioning session with a location server, wherein the UE-specific aperiodic positioning signal is triggered by the anchor node based at least in part on an instruction from the location server to the anchor node.

The reception component 802 may receive, from a sidelink hub UE, an indication that the sidelink hub UE has initiated a positioning session with the UE, wherein the UE-specific aperiodic positioning signal is triggered by the anchor node based at least in part on an instruction from the sidelink hub UE to the anchor node. The reception component 802 may receive, from the anchor node, a configuration of aperiodic positioning signal resources via a higher layer message, wherein the configuration indicates one or more of: a time and frequency resource for the UE-specific aperiodic positioning signal, a sequence, a resource element mapping pattern, a transmit power, a triggering state including a TCI state or QCL properties, or a triggering offset associated with the UE-specific aperiodic positioning signal.

The reception component 802 may receive, from the anchor node, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and the indication is received via RRC signaling or via the control information that triggers the UE-specific aperiodic positioning signal. The transmission component 804 may transmit the response based at least in part on a condition being satisfied, wherein the condition is satisfied based at least in part on a power level associated with the UE-specific aperiodic positioning signal satisfying a threshold.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
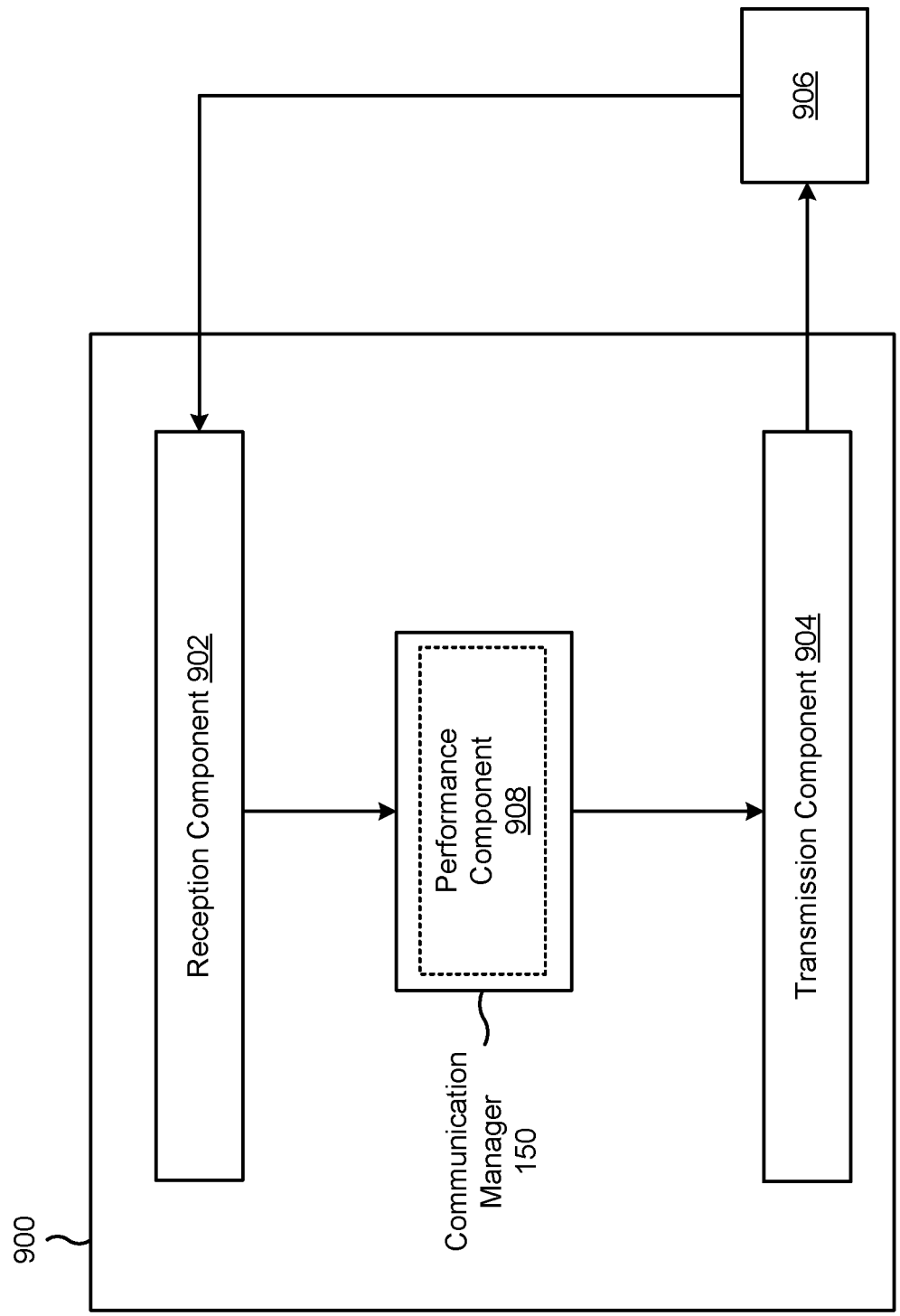

FIG. 9 is a diagram of an example apparatus 900 for wireless communication. The apparatus 900 may be an anchor node, or the anchor node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a performance component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the anchor node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the anchor node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the anchor node described in connection with FIG. 2. In some aspects, the transmission component 904 may be co-located with the reception component 902 in a transceiver.

The transmission component 904 may transmit, to a UE, control information that triggers a UE-specific aperiodic positioning signal. The reception component 902 or the transmission component 904 may perform, to the UE, the UE-specific aperiodic positioning signal based at least in part on the control information. The reception component 902 may receive, from the UE, a response based at least in part on the UE-specific aperiodic positioning signal.

The reception component 902 may receive, from a location server, an indication that the location server has initiated a positioning session with the UE, wherein the UE-specific aperiodic positioning signal is triggered by the anchor node based at least in part on an instruction from the location server to the anchor node. The reception component 902 may receive, from a location server, an instruction for the anchor node to trigger the UE-specific aperiodic positioning signal.

The transmission component 904 may transmit, to the UE, a configuration of aperiodic positioning signal resources via a higher layer message, wherein the configuration indicates one or more of: a time and frequency resource for the UE-specific aperiodic positioning signal, a sequence, a resource element mapping pattern, a transmit power, a triggering state including a TCI state or QCL properties, or a triggering offset associated with the UE-specific aperiodic positioning signal.

The transmission component 904 may transmit, to the UE, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and the indication is received via RRC signaling or via the control information that triggers the UE-specific aperiodic positioning signal.

The reception component 902 may receive the response based at least in part on a condition being satisfied, wherein the condition is satisfied based at least in part on a power level associated with the UE-specific aperiodic positioning signal satisfying a threshold. The performance component 908 may perform an early termination of a beam sweeping of the UE-specific aperiodic positioning signal based at least in part on the response received from the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from an anchor node, control information that triggers a UE-specific aperiodic positioning signal; performing, to the anchor node, the UE-specific aperiodic positioning signal based at least in part on the control information; and transmitting, to the anchor node, a response based at least in part on the UE-specific aperiodic positioning signal.

Aspect 2: The method of Aspect 1, wherein the control information is downlink control information, the UE-specific aperiodic positioning signal is a downlink aperiodic positioning reference signal that is received from the anchor node, and the anchor node is a base station.

Aspect 3: The method of any of Aspects 1 through 2, wherein the control information is downlink control information, the UE-specific aperiodic positioning signal is an uplink aperiodic sounding reference signal for positioning that is transmitted to the anchor node, and the anchor node is a base station.

Aspect 4: The method of any of Aspects 1 through 3, wherein the control information is sidelink control information, the UE-specific aperiodic positioning signal is a sidelink positioning reference signal that is received from the anchor node, and the anchor node is a sidelink anchor node.

Aspect 5: The method of any of Aspects 1 through 4, further comprising: receiving, from a location server, an indication that the location server has initiated a positioning session with the UE, wherein the UE-specific aperiodic positioning signal is triggered by the anchor node based at least in part on an instruction from the location server to the anchor node.

Aspect 6: The method of any of Aspects 1 through 5, further comprising: initiating a positioning session with a location server, wherein the UE-specific aperiodic positioning signal is triggered by the anchor node based at least in part on an instruction from the location server to the anchor node.

Aspect 7: The method of any of Aspects 1 through 6, further comprising: receiving, from a sidelink hub UE, an indication that the sidelink hub UE has initiated a positioning session with the UE, wherein the UE-specific aperiodic positioning signal is triggered by the anchor node based at least in part on an instruction from the sidelink hub UE to the anchor node.

Aspect 8: The method of any of Aspects 1 through 7, further comprising: receiving, from the anchor node, a configuration of aperiodic positioning signal resources via a higher layer message, wherein the configuration indicates one or more of: a time and frequency resource for the UE-specific aperiodic positioning signal, a sequence, a resource element mapping pattern, a transmit power, a triggering state including a transmission configuration indication state or quasi co-location properties, or a triggering offset associated with the UE-specific aperiodic positioning signal.

Aspect 9: The method of any of Aspects 1 through 8, wherein the UE-specific aperiodic positioning signal is one of a plurality of UE-specific aperiodic positioning signals transmitted by the anchor node using beam sweeping, wherein UE-specific aperiodic positioning signals of the plurality of UE-specific aperiodic positioning signals are triggered with different transmission configuration indication states or quasi co-location properties.

Aspect 10: The method of any of Aspects 1 through 9, further comprising: receiving, from the anchor node, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and wherein the indication is received via radio resource control signaling or via the control information that triggers the UE-specific aperiodic positioning signal.

Aspect 11: The method of any of Aspects 1 through 10, wherein the response transmitted to the anchor node based at least in part on the UE-specific aperiodic positioning signal indicates one or more of: an acknowledgement of a reception of the UE-specific aperiodic positioning signal, a measurement report that includes a measurement or a resource identifier associated with the UE-specific aperiodic positioning signal, or another reference signal transmission for a round-trip time based positioning.

Aspect 12: The method of any of Aspects 1 through 11, wherein transmitting the response comprises transmitting the response based at least in part on a condition being satisfied, wherein the condition is satisfied based at least in part on a power level associated with the UE-specific aperiodic positioning signal satisfying a threshold.

Aspect 13: The method of any of Aspects 1 through 12, wherein the response transmitted by the UE triggers, at the anchor node, an early termination of a beam sweeping of the UE-specific aperiodic positioning signal.

Aspect 14: The method of any of Aspects 1 through 13, wherein the response is not received at the anchor node or the response is a negative response indicated that the UE-specific aperiodic positioning signal was not received, and the UE-specific aperiodic positioning signal is retriggered by the anchor node, the anchor node is no longer used for positioning, or the UE-specific aperiodic positioning signal is reconfigured using an alternate configuration and retriggered by the anchor node.

Aspect 15: A method of wireless communication performed by an anchor node, comprising: transmitting, to a user equipment (UE), control information that triggers a UE-specific aperiodic positioning signal; performing, to the UE, the UE-specific aperiodic positioning signal based at least in part on the control information; and receiving, from the UE, a response based at least in part on the UE-specific aperiodic positioning signal.

Aspect 16: The method of Aspect 15, wherein the control information is downlink control information, the UE-specific aperiodic positioning signal is a downlink aperiodic positioning reference signal that is transmitted to the UE, and the anchor node is a base station.

Aspect 17: The method of any of Aspects 15 through 16, wherein the control information is downlink control information, the UE-specific aperiodic positioning signal is an uplink aperiodic sounding reference signal for positioning that is received from the UE, and the anchor node is a base station.

Aspect 18: The method of any of Aspects 15 through 17, wherein the control information is sidelink control information, the UE-specific aperiodic positioning signal is a sidelink positioning reference signal that is transmitted to the UE, and the anchor node is a sidelink anchor node.

Aspect 19: The method of any of Aspects 15 through 18, further comprising: receiving, from a location server, an indication that the location server has initiated a positioning session with the UE, wherein the UE-specific aperiodic positioning signal is triggered by the anchor node based at least in part on an instruction from the location server to the anchor node.

Aspect 20: The method of any of Aspects 15 through 19, further comprising: receiving, from a location server, an instruction for the anchor node to trigger the UE-specific aperiodic positioning signal.

Aspect 21: The method of any of Aspects 15 through 20, further comprising: transmitting, to the UE, a configuration of aperiodic positioning signal resources via a higher layer message, wherein the configuration indicates one or more of: a time and frequency resource for the UE-specific aperiodic positioning signal, a sequence, a resource element mapping pattern, a transmit power, a triggering state including a transmission configuration indication state or quasi co-location properties, or a triggering offset associated with the UE-specific aperiodic positioning signal.

Aspect 22: The method of any of Aspects 15 through 21, wherein the UE-specific aperiodic positioning signal is one of a plurality of UE-specific aperiodic positioning signals transmitted by the anchor node using beam sweeping, wherein UE-specific aperiodic positioning signals of the plurality of UE-specific aperiodic positioning signals are triggered with different transmission configuration indication states or quasi co-location properties.

Aspect 23: The method of any of Aspects 15 through 22, further comprising: transmitting, to the UE, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and wherein the indication is received via radio resource control signaling or via the control information that triggers the UE-specific aperiodic positioning signal.

Aspect 24: The method of any of Aspects 15 through 23, wherein the response transmitted to the anchor node based at least in part on the UE-specific aperiodic positioning signal indicates one or more of: an acknowledgement of a reception of the UE-specific aperiodic positioning signal, a measurement report that includes a measurement or a resource identifier associated with the UE-specific aperiodic positioning signal, or another reference signal transmission for a round-trip time based positioning.

Aspect 25: The method of any of Aspects 15 through 24, wherein receiving the response comprises receiving the response based at least in part on a condition being satisfied, wherein the condition is satisfied based at least in part on a power level associated with the UE-specific aperiodic positioning signal satisfying a threshold.

Aspect 26: The method of any of Aspects 15 through 25, further comprising: performing an early termination of a beam sweeping of the UE-specific aperiodic positioning signal based at least in part on the response received from the UE.

Aspect 27: An apparatus for wireless communication at a device, comprising a processor; memory coupled with the processor; and instructions stored in the memory and executable by the processor to cause the apparatus to perform the method of one or more of Aspects 1-14.

Aspect 28: A device for wireless communication, comprising a memory and one or more processors coupled to the memory, the one or more processors configured to perform the method of one or more of Aspects 1-14.

Aspect 29: An apparatus for wireless communication, comprising at least one means for performing the method of one or more of Aspects 1-14.

Aspect 30: A non-transitory computer-readable medium storing code for wireless communication, the code comprising instructions executable by a processor to perform the method of one or more of Aspects 1-14.

Aspect 31: A non-transitory computer-readable medium storing a set of instructions for wireless communication, the set of instructions comprising one or more instructions that, when executed by one or more processors of a device, cause the device to perform the method of one or more of Aspects 1-14.

Aspect 32: An apparatus for wireless communication at a device, comprising a processor; memory coupled with the processor; and instructions stored in the memory and executable by the processor to cause the apparatus to perform the method of one or more of Aspects 15-26.

Aspect 33: A device for wireless communication, comprising a memory and one or more processors coupled to the memory, the one or more processors configured to perform the method of one or more of Aspects 15-26.

Aspect 34: An apparatus for wireless communication, comprising at least one means for performing the method of one or more of Aspects 15-26.

Aspect 35: A non-transitory computer-readable medium storing code for wireless communication, the code comprising instructions executable by a processor to perform the method of one or more of Aspects 15-26.

Aspect 36: A non-transitory computer-readable medium storing a set of instructions for wireless communication, the set of instructions comprising one or more instructions that, when executed by one or more processors of a device, cause the device to perform the method of one or more of Aspects 15-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive, from an anchor node, control information that triggers a UE-specific aperiodic positioning signal, wherein:
the UE-specific aperiodic positioning signal is one of a plurality of UE-specific aperiodic positioning signals transmitted by the anchor node using beam sweeping, and
UE-specific aperiodic positioning signals of the plurality of UE-specific aperiodic positioning signals are triggered with different transmission configuration indication states or quasi co-location properties;
perform, to the anchor node, the UE-specific aperiodic positioning signal based at least in part on the control information; and
transmit, to the anchor node, a response based at least in part on the UE-specific aperiodic positioning signal.

2. The apparatus of claim 1, wherein the control information is downlink control information, the UE-specific aperiodic positioning signal is a downlink aperiodic positioning reference signal that is received from the anchor node, and the anchor node is a base station.

3. The apparatus of claim 1, wherein the control information is downlink control information, the UE-specific aperiodic positioning signal is an uplink aperiodic sounding reference signal for positioning that is transmitted to the anchor node, and the anchor node is a base station.

4. The apparatus of claim 1, wherein the control information is sidelink control information, the UE-specific aperiodic positioning signal is a sidelink positioning reference signal that is received from the anchor node, and the anchor node is a sidelink anchor node.

5. The apparatus of claim 1, wherein the one or more processors are further configured to:
receive, from a location server, an indication that the location server has initiated a positioning session with the UE, wherein the UE-specific aperiodic positioning signal is triggered by the anchor node based at least in part on an instruction from the location server to the anchor node.

6. The apparatus of claim 1, wherein the one or more processors are further configured to:
initiate a positioning session with a location server, wherein the UE-specific aperiodic positioning signal is triggered by the anchor node based at least in part on an instruction from the location server to the anchor node.

7. The apparatus of claim 1, wherein the one or more processors are further configured to:
receive, from a sidelink hub UE, an indication that the sidelink hub UE has initiated a positioning session with the UE, wherein the UE-specific aperiodic positioning signal is triggered by the anchor node based at least in part on an instruction from the sidelink hub UE to the anchor node.

8. The apparatus of claim 1, wherein the one or more processors are further configured to:
receive, from the anchor node, a configuration of aperiodic positioning signal resources via a higher layer message, wherein the configuration indicates one or more of: a time and frequency resource for the UE-specific aperiodic positioning signal, a sequence, a resource element mapping pattern, a transmit power, a triggering state including a transmission configuration indication state or quasi co-location properties, or a triggering offset associated with the UE-specific aperiodic positioning signal.

9. The apparatus of claim 1, wherein the one or more processors are further configured to:
receive, from the anchor node, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and wherein the indication is received via radio resource control signaling or via the control information that triggers the UE-specific aperiodic positioning signal.

10. The apparatus of claim 1, wherein the response transmitted to the anchor node based at least in part on the UE-specific aperiodic positioning signal indicates one or more of: an acknowledgement of a reception of the UE-specific aperiodic positioning signal, a measurement report that includes a measurement or a resource identifier associated with the UE-specific aperiodic positioning signal, or another reference signal transmission for a round-trip time based positioning.

11. The apparatus of claim 1, wherein transmitting the response comprises transmitting the response based at least in part on a condition being satisfied, wherein the condition is satisfied based at least in part on a power level associated with the UE-specific aperiodic positioning signal satisfying a threshold.

12. The apparatus of claim 1, wherein the response transmitted by the UE triggers, at the anchor node, an early termination of a beam sweeping of the UE-specific aperiodic positioning signal.

13. The apparatus of claim 1, wherein the response is not received at the anchor node or the response is a negative response indicated that the UE-specific aperiodic positioning signal was not received, and the UE-specific aperiodic positioning signal is retriggered by the anchor node, the anchor node is no longer used for positioning, or the UE-specific aperiodic positioning signal is reconfigured using an alternate configuration and retriggered by the anchor node.

14. An apparatus for wireless communication at an anchor node, comprising:
one or more memories; and
one or more processors, coupled to the one or more memories, configured to:

transmit, to a user equipment (UE), control information that triggers a UE-specific aperiodic positioning signal, wherein:
- the UE-specific aperiodic positioning signal is one of a plurality of UE-specific aperiodic positioning signals transmitted by the anchor node using beam sweeping, and
- UE-specific aperiodic positioning signals of the plurality of UE-specific aperiodic positioning signals are triggered with different transmission configuration indication states or quasi co-location properties;

perform, to the UE, the UE-specific aperiodic positioning signal based at least in part on the control information; and receive, from the UE, a response based at least in part on the UE-specific aperiodic positioning signal.

15. The apparatus of claim 14, wherein:
the control information is downlink control information (DCI), the UE-specific aperiodic positioning signal is a downlink aperiodic positioning reference signal (PRS) that is transmitted to the UE, and the anchor node is a base station;
the control information is DCI, the UE-specific aperiodic positioning signal is an uplink aperiodic sounding reference signal for positioning that is received from the UE, and the anchor node is a base station; or
the control information is sidelink control information, the UE-specific aperiodic positioning signal is a sidelink PRS that is transmitted to the UE, and the anchor node is a sidelink anchor node.

16. The apparatus of claim 14, wherein the one or more processors are further configured to:
receive, from a location server, an indication that the location server has initiated a positioning session with the UE, wherein the UE-specific aperiodic positioning signal is triggered by the anchor node based at least in part on an instruction from the location server to the anchor node; or
receive, from the location server, an instruction for the anchor node to trigger the UE-specific aperiodic positioning signal.

17. The apparatus of claim 14, wherein the one or more processors are further configured to:
transmit, to the UE, a configuration of aperiodic positioning signal resources via a higher layer message, wherein the configuration indicates one or more of: a time and frequency resource for the UE-specific aperiodic positioning signal, a sequence, a resource element mapping pattern, a transmit power, a triggering state including a transmission configuration indication state or quasi co-location properties, or a triggering offset associated with the UE-specific aperiodic positioning signal.

18. The apparatus of claim 14, wherein the one or more processors are further configured to:
transmit, to the UE, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and wherein the indication is received via radio resource control signaling or via the control information that triggers the UE-specific aperiodic positioning signal.

19. The apparatus of claim 14, wherein the response transmitted to the anchor node based at least in part on the UE-specific aperiodic positioning signal indicates one or more of: an acknowledgement of a reception of the UE-specific aperiodic positioning signal, a measurement report that includes a measurement or a resource identifier associated with the UE-specific aperiodic positioning signal, or another reference signal transmission for a round-trip time based positioning.

20. The apparatus of claim 14, wherein the one or more processors are further configured to:
perform an early termination of the beam sweeping of the UE-specific aperiodic positioning signal based at least in part on the response received from the UE.

21. A method of wireless communication performed by a user equipment (UE), comprising:
receiving, from an anchor node, control information that triggers a UE-specific aperiodic positioning signal, wherein:
- the UE-specific aperiodic positioning signal is one of a plurality of UE-specific aperiodic positioning signals transmitted by the anchor node using beam sweeping, and
- UE-specific aperiodic positioning signals of the plurality of UE-specific aperiodic positioning signals are triggered with different transmission configuration indication states or quasi co-location properties;

performing, to the anchor node, the UE-specific aperiodic positioning signal based at least in part on the control information; and transmitting, to the anchor node, a response based at least in part on the UE-specific aperiodic positioning signal.

22. The method of claim 21, wherein:
the control information is downlink control information (DCI), the UE-specific aperiodic positioning signal is a downlink aperiodic positioning reference signal (PRS) that is transmitted to the UE, and the anchor node is a base station;
the control information is DCI, the UE-specific aperiodic positioning signal is an uplink aperiodic sounding reference signal for positioning that is received from the UE, and the anchor node is a base station; or
the control information is sidelink control information, the UE-specific aperiodic positioning signal is a sidelink PRS that is transmitted to the UE, and the anchor node is a sidelink anchor node.

23. The method of claim 21, further comprising:
receiving, from a location server, an indication that the location server has initiated a positioning session with the UE, wherein the UE-specific aperiodic positioning signal is triggered by the anchor node based at least in part on an instruction from the location server to the anchor node;
initiating a positioning session with a location server, wherein the UE-specific aperiodic positioning signal is triggered by the anchor node based at least in part on an instruction from the location server to the anchor node; or
receiving, from a sidelink hub UE, an indication that the sidelink hub UE has initiated a positioning session with the UE, wherein the UE-specific aperiodic positioning signal is triggered by the anchor node based at least in part on an instruction from the sidelink hub UE to the anchor node.

24. The method of claim 21, further comprising:
receiving, from the anchor node, a configuration of aperiodic positioning signal resources via a higher layer message, wherein the configuration indicates one or more of: a time and frequency resource for the UE-specific aperiodic positioning signal, a sequence, a resource element mapping pattern, a transmit power, a triggering state including a transmission configuration indication state or quasi co-location properties, or a triggering offset associated with the UE-specific aperiodic positioning signal; or receiving, from the anchor node, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and wherein the indication is received via radio resource control signaling or via the control information that triggers the UE-specific aperiodic positioning signal.

25. The apparatus of claim 14, wherein the one or more processors are further configured to:

receive, from a sidelink hub UE, an instruction for the anchor node to trigger the UE-specific aperiodic positioning signal.

26. A method of wireless communication performed by an anchor node, comprising:

transmitting, to a user equipment (UE), control information that triggers a UE-specific aperiodic positioning signal, wherein:

the UE-specific aperiodic positioning signal is one of a plurality of UE-specific aperiodic positioning signals transmitted by the anchor node using beam sweeping, and UE-specific aperiodic positioning signals of the plurality of UE-specific aperiodic positioning signals are triggered with different transmission configuration indication states or quasi co-location properties;

performing, to the UE, the UE-specific aperiodic positioning signal based at least in part on the control information; and receiving, from the UE, a response based at least in part on the UE-specific aperiodic positioning signal.

27. The method of claim 26, wherein:

the control information is downlink control information (DCI), the UE-specific aperiodic positioning signal is a downlink aperiodic positioning reference signal (PRS) that is transmitted to the UE, and the anchor node is a base station;

the control information is DCI, the UE-specific aperiodic positioning signal is an uplink aperiodic sounding reference signal for positioning that is received from the UE, and the anchor node is a base station; or the control information is sidelink control information, the UE-specific aperiodic positioning signal is a sidelink PRS that is transmitted to the UE, and the anchor node is a sidelink anchor node.

28. The method of claim 26, further comprising:

receiving, from a location server, an indication that the location server has initiated a positioning session with the UE, wherein the UE-specific aperiodic positioning signal is triggered by the anchor node based at least in part on an instruction from the location server to the anchor node; or receiving, from a location server, an instruction for the anchor node to trigger the UE-specific aperiodic positioning signal.

29. The method of claim 26, further comprising:

transmitting, to the UE, a configuration of aperiodic positioning signal resources via a higher layer message, wherein the configuration indicates one or more of: a time and frequency resource for the UE-specific aperiodic positioning signal, a sequence, a resource element mapping pattern, a transmit power, a triggering state including a transmission configuration indication state or quasi co-location properties, or a triggering offset associated with the UE-specific aperiodic positioning signal; or transmitting, to the UE, an indication of a resource for transmitting the response to the anchor node based at least in part on the UE-specific aperiodic positioning signal, wherein the resource is associated with one or more UE-specific aperiodic positioning signal resources, one or more cells, or one or more anchor nodes, and wherein the indication is received via radio resource control signaling or via the control information that triggers the UE-specific aperiodic positioning signal.

30. The method of claim 26, further comprising:

receiving, from a sidelink hub UE, an instruction for the anchor node to trigger the UE-specific aperiodic positioning signal.

* * * * *